Dec. 23, 1958              E. E. HOOD              2,865,478

TWO-SPEED COASTER BRAKE FOR VELOCIPEDES AND THE LIKE

Filed Feb. 20, 1956                          3 Sheets-Sheet 1

WITNESS:
Esther M. Stockton

INVENTOR.
Edwin Elliott Hood
BY
Clinton S. Janes
ATTORNEY

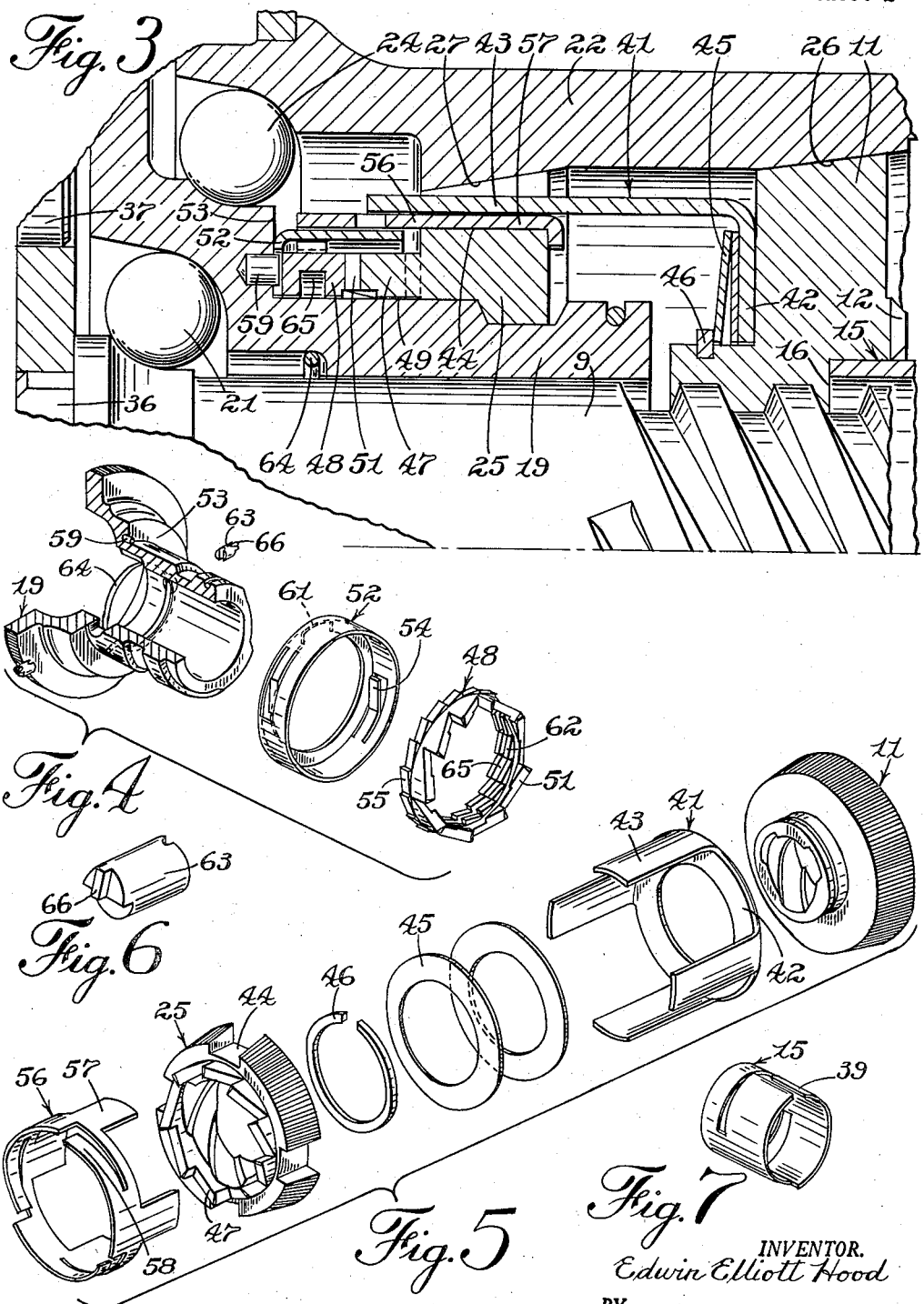

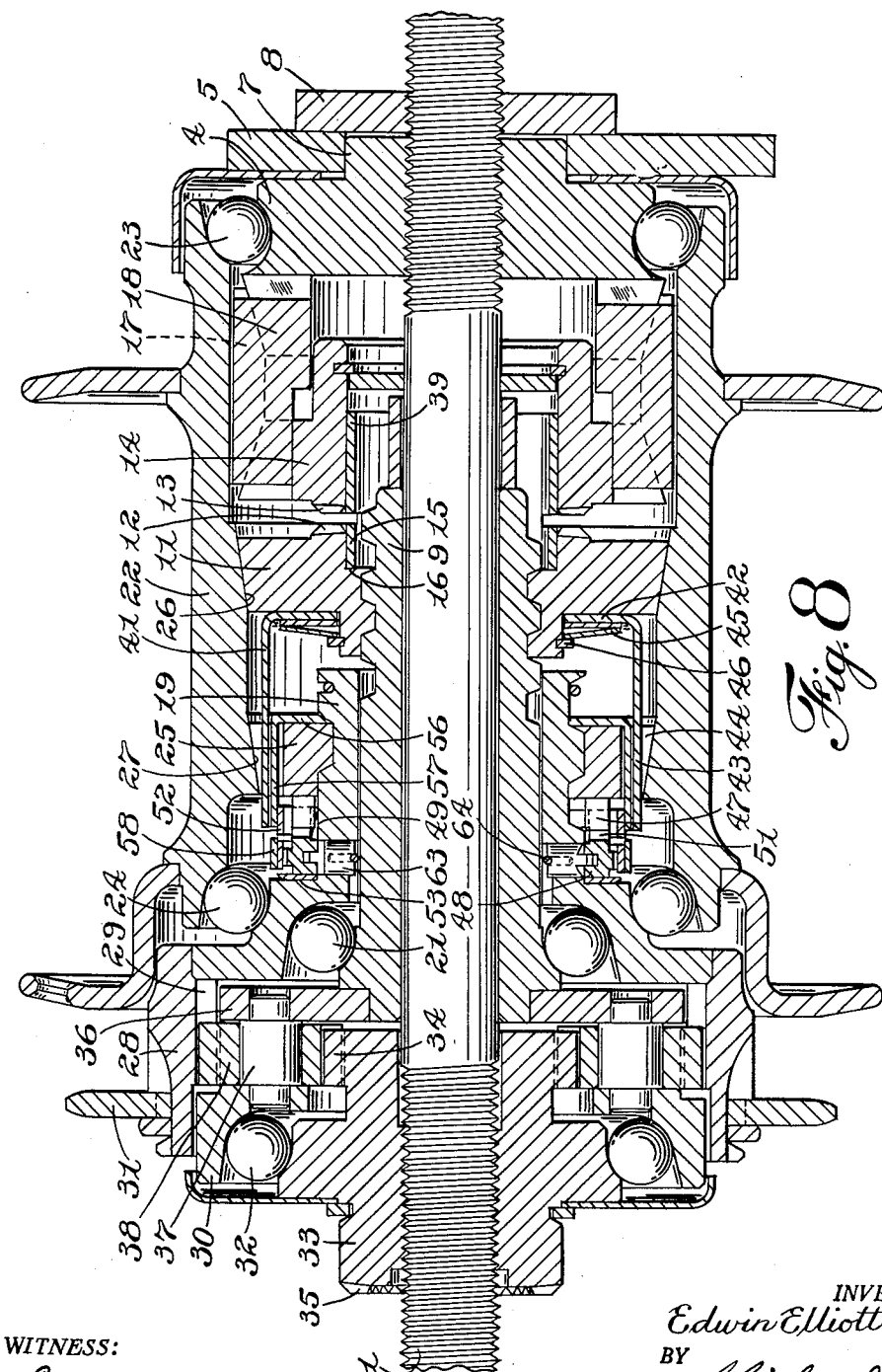

United States Patent Office 2,865,478
Patented Dec. 23, 1958

2,865,478

TWO-SPEED COASTER BRAKE FOR VELOCIPEDES AND THE LIKE

Edwin Elliott Hood, Elmira, N. Y., assignor to Bendix Aviation Corporation, Elmira Heights, N. Y., a corporation of Delaware Application February 20, 1956, Serial No. 566,449

6 Claims. (Cl. 192—6)

The present invention relates to a two-speed coaster brake for velocipedes and the like, and more particularly to a semi-automatic type in which shifting from one gear ratio to the other is brought about by a slight backward movement of the pedal cranks.

It is an object of the present invention to provide a novel semi-automatic drive of this type which is positive and reliable in operation while being comparatively simple and economical in construction.

It is another object to provide such a device in which the control of the various operations is independent of the movement of the hub so that the operator may "coast" at will without causing the gearing to shift from one speed to the other, and there is no drag on the wheel during coasting. Moreover the bicycle may be rolled backward freely without causing the brake to lock or jam.

It is another object to provide such a device in which very little backward motion of the pedals is required to effect the shift either to high or low gear, so that there is little likelihood of inadvertently applying the brake when it is merely desired to shift the gear ratio.

Further objects and advantages will be apparent from the following description taken in connection with the accompanying drawings in which:

Fig. 3 is a detail on an enlarged scale showing the high speed and low speed clutch members with the controlling mechanism therefor;

Fig. 4 is a perspective detail view of the high speed screw shaft, indexing cup, and selector sleeve shown partly in section and in disassembled relation;

Fig. 5 is a similar disassembled view of the low speed and high speed clutch members with the high speed retarding mechanism and the selector spring;

Fig. 6 is a detail in perspective of a selector pawl;

Fig. 7 is a detail in perspective of the retarder spring sleeve for the low speed clutch member; and Fig. 8 is an enlarged longitudinal substantially mid-sectional view of the hub, gearing, and brake assembly.

Figure 1:
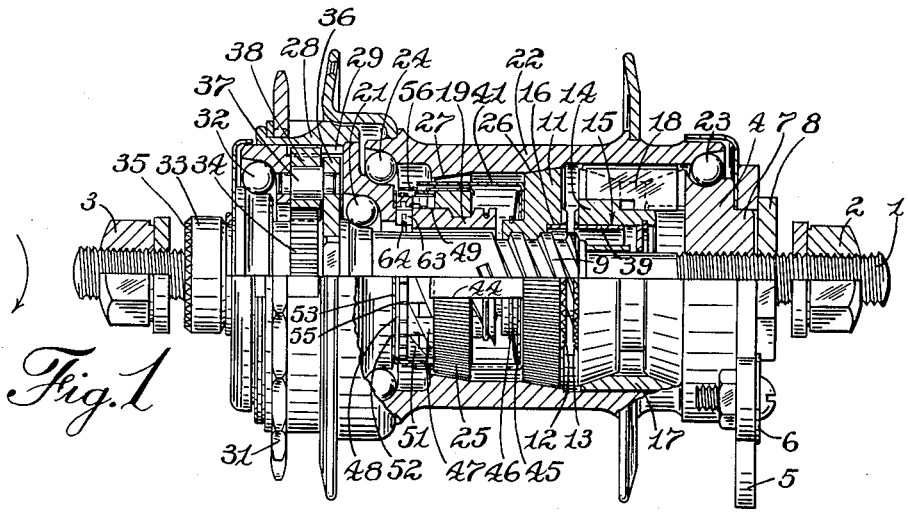
Fig. 1 is a side elevation, partly broken away and in section, of a preferred embodiment of the invention showing the parts in low gear driving position.

The present invention is in the nature of an improvement on the two-speed hub disclosed in the patents to Svenson 813,464 and 813,465, being particularly related to the structure shown in the Patent 813,464.

In the Svenson two-speed hub the shifting operation is controlled by a drag member 18 which bears frictionally on the interior of the hub 7. Since the control of the shifting operation is consequently governed by the rotation of the hub, the shift takes place whenever the hub overruns in coasting, whether or not the operator actually desires to change the gear ratio.

Another disadvantage in the Svenson structure is that when the wheel is turned backwards, the hub, through the retarder 18, tends to drag both the controller ring 20 and the high speed clutch member 6 backward with it. The controller ring will turn the high speed screw shaft backward by the pawl 25. This will traverse the low speed clutch nut 9 into engagement with the brake applying member 10. This arrests the backward rotation of both screw shafts, and the torque transmitted from the hub through the reduction gearing tends to apply the brake.

The high speed clutch member 6 has been rotating backward with the high speed screw shaft but when the latter is thus stopped the member 6 continues to rotate backward on its screw shaft which causes it to engage the hub if the device is in high gear position. This causes the high speed screw shaft to be forcibly rotated backward by the backwardly moving hub, which rotates the low speed screw shaft backward with a force which is multiplied by the reduction gearing, thus stopping the backward movement of the vehicle and jamming the brake so that it may even be difficult to release it.

As above stated, since the control of the gearing in applicant's device is independent of the movement of the hub, as will be more particularly set forth, both of these disadvantages of the Svenson structure are overcome.

In Figs. 1 and 8 of the drawing there is illustrated an axle 1 which is arranged to be fixedly mounted in the rear fork of a bicycle or the like, not illustrated, and rigidly clamped thereto by means of nuts 2 and 3. An anchor and brake expander member 4 is adjustably mounted on one end of the axle 1 and is prevented from rotation by means of a torque arm 5 connected by a clip 6 to the frame of the vehicle in the usual manner. For this purpose the anchor member 4 is provided with a projection 7 of non-circular shape, which is received in a conforming opening in the torque arm 5, the torque arm being fixed thereon by means of a jam nut 8.

A low speed screw shaft 9 is journalled on the axle 1 and has threaded thereon a low speed clutch and brake applying member 11. The member 11 is provided with dentals 12 adapted to engage similar dentals 13 on a movable brake expander member 14 which is frictionally mounted on an elastic sleeve 15 pressed into a counterbore 16 in the member 11. The expander members 4 and 14 are provided with conical surfaces adapted to engage similar interior surfaces in a pair of brake shoes 17, rotation of the expander member 14 and brake shoes 17 being prevented by rectangular keys 18 slidably engaging suitable notches in the peripheries of the expander members.

A high speed screw shaft 19 is rotatably mounted on the low speed screw shaft by means of bearings 21, and a wheel hub 22 is rotatably mounted at its ends on the anchor member 4 and high speed screw shaft 19 by means of bearings 23 and 24 respectively. A high speed clutch member 25 is threaded on the high speed screw shaft, and the interior of the hub 22 is provided with clutch surfaces 26, 27 for engagement with the low speed clutch member 11 and high speed clutch member 25 respectively.

A driving member 28 having internal orbit gear teeth 29 is rigidly mounted in any suitable manner on the end of the high speed screw shaft 19, and has a sprocket 31 fixed thereon for the reception of the driving chain of the vehicle. A bearing cone member 33 adjustably mounted on the axle 1 has a sun gear 34 fixed thereon or formed integrally therewith, and is prevented from rotation by means of dentals 35 adapted to be clamped against the fork member of the vehicle by the clamp nut 3.

The low speed screw shaft 9 has a planet carrier member 36 suitably fixed thereon, and having gudgeons 37 fixed therein rotatably supporting planet pinions 38 which mesh with the orbit gear teeth 29 and with the sun gear 34. Rotation of the driving member 28 is thus transmitted to the low speed screw shaft 9 through the planetary gearing at reduced speed and correspondingly increased torque. The outer ends of the gudgeons 37 are mounted in a cup member 30 supported by bearings 32 running on the cone member 33.

The movable brake expander 14 is frictionally connected to the control nut and low speed clutch member 11 by means of the spring sleeve 15. As best shown in Fig. 7, this sleeve, which has a press fit in the counterbore 16 of the control nut 11, has elastic arms 39 which spring outwardly and bear frictionally in the interior of the expander 14. Since the latter is prevented from rotation by means of the keys 18 which spline it to the fixed anchor member 4, it will be seen that the rotation of the control nut 11 is frictionally opposed by the retarder spring sleeve 15, so as to cause the control nut to move longitudinally responsive to rotation of the low speed screw shaft on which it is threaded. The pitch of these threads is such that forward rotation of the screw shaft moves the control nut into clutching engagement with the interior clutch surface 26 of the hub 22, while backward rotation of the low speed screw shaft causes the control nut dentals 12 to engage the dentals 13 in the expander member 14 to lock these members together after which further backward rotation of said screw shaft causes the expander member to approach the anchor member 4 and thus move the brake shoes 17 into engagement with the interior of the hub.

In order to similarly control the high speed clutch member 25, it is frictionally connected to the low speed control nut, and thus indirectly connected to the stationary axle 1. This is accomplished, as best shown in Figs. 3 and 5, by means of a high speed retarder 41 in the form of a spider comprising a ring portion 42 adapted to bear frictionally against the side of the low speed control nut 11, and a plurality of arms 43 slidably engaged in peripheral notches 44 in the high speed clutch member, thereby forming a splined connection therewith. The ring portion 42 of member 41 is pressed against the control nut 11 by means of a spring washer 45 which is retained on the control nut 11 by a split thrust ring 46. The design of this frictional connection including the stiffness of the spring washer 45 is such that this connection will slip under substantially less torque than that required to overcome the drag of the spring sleeve 15 on the control nut 11.

The high speed clutch nut 25 is formed with a plurality of inclined teeth 47 on its side toward the driving end of the hub, and an abutment member in the form of a selector sleeve 48, journalled on a smooth portion 49 of the high speed screw shaft has a similar number of mating teeth 51, as best shown in Fig. 4. The selector sleeve 48 is in the path of movement of the high speed clutch nut 25 toward engagement with the clutch surface 27 of the hub, and the parts are so dimensioned that if the teeth 47, 51 of the clutch member and selector sleeve are so positioned as to mesh fully with each other, the clutch member is free to engage and drive the hub. However, if the selector sleeve 48 is indexed to a rotary position in which the points of its teeth engage the sides of the teeth of the clutch member, then the movement of the clutch member is arrested before it engages the hub.

In order to bring about indexing movement of the selector sleeve 48 responsive to backward rotation of the high speed screw shaft, a ratchet member in the form of an indexing cup 52 is mounted on the high speed screw shaft between the selector sleeve 48 and a shoulder 53 on said shaft. The indexing cup 52 has a plurality of spring pawls 54 displaced inwardly from its rim in position to engage ratchet teeth 55 formed on the periphery of the selector sleeve. There are twice as many ratchet teeth 55 on the selector sleeve as the number of the abutment teeth 51 thereof.

The indexing cup 52 is frictionally connected to the high speed clutch nut 25 by means of a selector spring sleeve 56 (Fig. 5) having axially extending arms 57 engaging in the peripheral slots 44 of the high speed clutch nut 25, and having spring fingers 58 bearing frictionally on the exterior of the indexing cup. The indexing cup has a lost motion connection to the high speed screw shaft in the form of a pin 59 projecting laterally from the shoulder 53 on the screw shaft, and entering an arcuate cutout portion 61 (Fig. 4) in the indexing cup. The cutout portion 61 is so dimensioned that the lost motion of the cup on the high speed screw shaft is substantially equal to or slightly greater than the arcuate distance between successive ratchet teeth 55 on the selector sleeve.

The selector sleeve 48 also has ratchet teeth 62 formed in the interior thereof, of a number equal to the exterior ratchet teeth 55. Selector pawl members 63 are mounted for radial movement in the smooth portion 49 of the screw shaft, and are yieldingly pressed into engagement with the ratchet teeth 62 of the selector sleeve by means of a spring ring 64. Preferably, the interior of the selector sleeve 48 is provided with a groove 65 for the reception of lugs 66 on the noses of the pawls 63 whereby the pawls are maintained oriented with respect to the ratchet teeth, and the pawls also serve to locate the selector sleeve on the screw shaft.

In operation, starting with the parts in the positions illustrated in Fig. 1, forward rotation of the driving member in the direction of the arrow causes the low speed screw shaft 9 to rotate forwardly, and since the rotary speed of the low speed clutch nut 11 is impeded by the retarder spring 15, said clutch member engages the surface 26 of the hub and transmits the rotation of the low speed screw shaft thereto. At this time, the high speed screw shaft is also rotated, and the high speed clutch nut 25 is urged toward operative position by the frictional drag through the retarder spider 41 from the low speed clutch nut 11. However, at this time the teeth 51 of the selector sleeve 48 are in the path of movement of the teeth 47 of the high speed clutch nut 25 and arrest its engaging movement so that these parts rotate in unison without contact with the hub. At this time, the indexing cup 52 is retarded in respect to its lost motion connection with the high speed screw shaft by virtue of its frictional drag connection with the high speed clutch nut 25 through the selector spring 56.

If the operator arrests the rotation of the pedals and coasts, the hub 22 overruns the low speed clutch nut 11 so that the latter backs away slightly and releases the hub, but no further action takes place, and if the operator resumes pedalling forward, the device remains in low gear.

When the operator desires to shift into high gear, he rotates his pedals backward slightly. The high speed screw shaft is consequently rotated backward, but the low speed clutch nut does not rotate in view of its frictional connection through the retarder sleeve 15 to the brake expander member 14. Consequently the high speed clutch nut 25 also does not rotate in view of its frictional connection through the spider 41 to the low speed clutch nut 11. The selector spring 56 therefore holds the indexing cup 52 stationary, which is permitted by its lost-motion connection 59, 61 with shaft 19. Cup 52 therefore, through its pawls 54, holds the selector sleeve 48 stationary. The selector pawls 63 therefore move back one tooth on the ratchet teeth 62 of the selector sleeve, thereby indexing the selector sleeve on the screw shaft one ratchet tooth.

Figure 2:
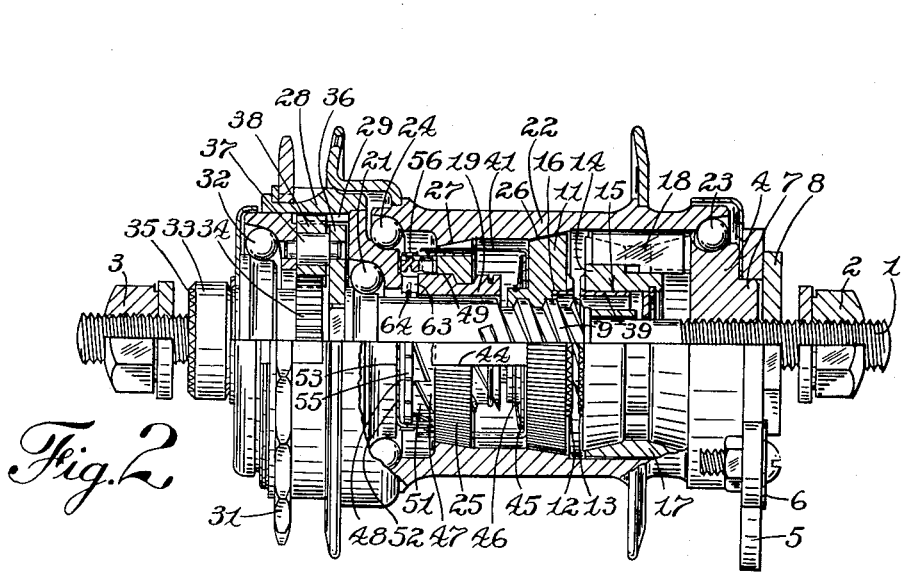
Fig. 2 is a view similar to Fig. 1 showing the parts in high gear driving position.

When forward motion of the operating mechanism is resumed, the high speed clutch nut 25 lags behind its screw shaft and moves into clutching engagement with the surface 27 in the interior of the hub 22 since the indexing of the selector sleeve 48 has brought its teeth into registry with the tooth spaces of the high speed clutch member as shown in Fig. 2. At the same time the selector spring sleeve 56, by its frictional connection between the high speed clutch member and the indexing cup 52 retards the indexing cup with respect to the screw shaft and the selector sleeve 48 which latter is compelled by the pawls 63 to rotate with the screw shaft during this time. Consequently the pawls 54 of the indexing cup move back and engage the next ratchet tooth 55 on the selector sleeve.

The device now operates in high gear, the hub 22 overrunning the low speed clutch nut 11. While in high gear the operator is also free to coast and resume pedaling as often as he pleases without causing the gearing to shift.

When however he desires to shift into low gear, back pedaling movement of the driving mechanism turns the high speed screw shaft backwards, the high speed clutch member is traversed away from its operative position as before by reason of its frictional connection with the stationary axle, the indexing cup 52 is consequently held from rotation and therefore holds the selector sleeve 48 from moving by means of its pawls 54. The selector pawls 63 in the high speed screw shaft therefore move back in the selector sleeve to engage the next ratchet tooth 62.

On subsequent forward drive, the high speed clutch nut 25 now finds that the selector sleeve 48 has been indexed to bring its abutment teeth 51 into the path of the teeth 47 of said clutch nut whereby engagement of the high speed clutch nut with the hub is prevented, and drive in low gear through the clutch nut 11 is resumed. During this initial forward movement the indexing cup 52 again lags back to its retarded position, whereby its pawls 54 engage the next ratchet tooth 55 of the selector sleeve 48.

It will be particularly noted that whether the device is in high gear or low gear, the hub may be rotated backward as by rolling the vehicle backward without causing any tendency for the brake to jam or lock up.

When it is desired to operate the brake, it is merely necessary to back pedal in the usual manner, whereupon the control nut 11 will operate the brake in the usual manner.

Although but one embodiment of the invention has been shown and described in detail it will be understood that other embodiments are possible, and changes may be made in the precise form and arrangement of the parts without departing from the spirit of the invention.

I claim:

1. In a two-speed coaster brake a fixed axle, an anchor member, means for immobilizing the anchor member, brake mechanism including a brake applying expander member adjacent one end of the axle having a splined connection with the anchor member, a low-speed screw shaft journalled on the axle, a low-speed driving clutch and brake operating member threaded on said screw shaft for alternative operative engagement with the hub and expander member, means frictionally connecting the low speed clutch member to the expander member, a driving member and high-speed screw shaft rotatably mounted on the low-speed screw shaft, a wheel hub rotatably mounted on the anchor member and the driving member, a high-speed clutch member threaded on the high-speed screw shaft for movement into and out of driving engagement with said hub, reduction gearing for rotating the low-speed screw shaft from the driving member, an abutment member rotatably mounted on the high-speed screw shaft in the path of engaging movement of the high speed clutch member, said abutment member and high speed clutch member having cooperating projections which, when in registry, abut and prevent the high speed clutch member from engaging the hub; and means responsive to backward and forward rotation of the driving member for indexing the abutment member relatively to the high speed clutch member to alternatively bring said projections into and out of registry.

2. A two-speed coaster brake as set forth in claim 1 in which the means for indexing the abutment member comprises a ratchet member frictionally connected to the low speed clutch member and having a positive lost motion connection to the high-speed screw shaft, said ratchet member having pawls engaging teeth on the periphery of the abutment member arranged to oppose backward rotation of the abutment member with respect to the ratchet member.

3. A two-speed coaster brake as set forth in claim 2 in which the frictional connection of the ratchet member to the low speed clutch member comprises a frictional connection between the ratchet member and the high speed clutch member, and a frictional connection between the two clutch members.

4. A two-speed coaster brake as set forth in claim 3 in which the frictional connection between the two clutch members is arranged to slip under substantially less torque than is required to cause slippage of the friction connection between the low speed clutch member and the brake expander member.

5. A two-speed coaster brake as set forth in claim 2 in which the frictional connection from the ratchet member to the low speed clutch member comprises a drag ring splined to the high speed clutch member and having arms bearing frictionally on the periphery of the ratchet member, a second drag member also splined to the high speed clutch member and having a frictional coupling with the low-speed clutch member.

6. A two-speed coaster brake as set forth in claim 5 in which the coupling between the low-speed clutch member and the brake expander member is calibrated to transmit without slipping substantially more torque than the maximum capacity of the coupling between the two clutch members.

References Cited in the file of this patent

UNITED STATES PATENTS

| | | |
|---|---|---|
| 813,464 | Svenson | Feb. 27, 1906 |
| 813,465 | Svenson | Feb. 27, 1906 |
| 894,516 | Maynes | July 28, 1908 |